(12) United States Patent
You et al.

(10) Patent No.: US 11,496,708 B2
(45) Date of Patent: Nov. 8, 2022

(54) VIDEO CONFERENCE SYSTEM

(71) Applicant: BENQ CORPORATION, Taipei (TW)

(72) Inventors: Lin-Yuan You, New Taipei (TW); Chen-Chi Wu, Taipei (TW)

(73) Assignee: BenQ Corporation, Taipei (TW)

( * ) Notice: Subject to any disclaimer, the term of this patent is extended or adjusted under 35 U.S.C. 154(b) by 0 days.

(21) Appl. No.: 17/137,523

(22) Filed: Dec. 30, 2020

(65) Prior Publication Data

US 2021/0203876 A1 Jul. 1, 2021

(30) Foreign Application Priority Data

Dec. 31, 2019 (CN) .......................... 201911409614.4

(51) Int. Cl.
| | |
|---|---|
| *H04N 7/15* | (2006.01) |
| *H04N 7/08* | (2006.01) |
| *H04N 5/38* | (2006.01) |
| *H04N 7/015* | (2006.01) |
| *H04N 5/44* | (2011.01) |

(52) U.S. Cl.
CPC ................ *H04N 7/08* (2013.01); *H04N 5/38* (2013.01); *H04N 5/44* (2013.01); *H04N 7/015* (2013.01); *H04N 7/15* (2013.01)

(58) Field of Classification Search
CPC ............ H04N 7/15; H04N 7/137; H04N 5/38; H04N 5/44; H04N 5/265; H04M 3/567; H04M 2201/22

USPC ............................................ 348/14.01–14.16
See application file for complete search history.

(56) References Cited

U.S. PATENT DOCUMENTS

| | | | |
|---|---|---|---|
| 9,179,078 B2 * | 11/2015 | Samadani | ............... H04N 5/272 |
| 9,804,731 B1 * | 10/2017 | Baloga | .................. G06F 3/0488 |
| 2013/0314421 A1 * | 11/2013 | Kim | ........................ G09B 17/00 |
| | | | 345/427 |
| 2014/0232814 A1 * | 8/2014 | Malhotra | .................. H04N 7/15 |
| | | | 348/14.07 |

FOREIGN PATENT DOCUMENTS

| | | | | |
|---|---|---|---|---|
| EP | 2756668 B1 | 3/2013 | | |
| GB | 2502100 A | * 11/2013 | ............. | A47B 21/00 |

\* cited by examiner

*Primary Examiner* — Melur Ramakrishnaiah

(57) ABSTRACT

A video conference system including a transmitter device and a receiver device is provided. The transmitter device includes a transmitter control unit, a transmitter input interface, a transmitter video circuit and a first wireless transmission module. The transmitter control unit is coupled to a video output port of an information system and receive a first video data from the video output port. The transmitter input interface receives a second video data from a first video source. The transmitter video circuit combines the first video data and the second video data as a combined video data. The first wireless transmission module transmits the combined video data to the receiver device. The receiver device, coupled to the display device, includes a second wireless transmission module, which receives the combined video data. The receiver device transmits the combined video data to the display device.

10 Claims, 12 Drawing Sheets

VIDEO CONFERENCE SYSTEM

This application claims the benefit of People's Republic of China application Serial No. 201911409614.4, filed Dec. 31, 2019, the subject matter of which is incorporated herein by reference.

BACKGROUND OF THE INVENTION

Field of the Invention

The invention relates in general to a video conference system, and more particularly to a video conference system capable of combining video data.

Description of the Related Art

The video conference systems for wireless presentation currently available in the market normally include a number of transmitter devices and a number of receiver devices. Each of the conference participants can connect a transmitter device to a video output port of his/her information processing device, and the receiver devices can respectively connected to: (1) a video input port of a near end display device at the same location with the transmitter device through wireless network; (2) a video input port of a far end display device at different location with the transmitter device through Internet connection. When the first presenter wants to play the frame of a computer operated by him/her, the first presenter can press a projection button of the transmitter device connected to his/her computer, and the transmitter device will be wirelessly connected to the receiver device, which enables the near end display device and the far end display device to play the image data from the first presenter's computer. By the same analogy, when the second presenter wants to play the frame of a computer operated by him/her, the second presenter can press a projection button of the transmitter device connected to his/her computer, and the near end display device and the far end display device will both play the image data from the second presenter's computer through the receiver device. Thus, when many people participate the presentation or the video conference and the video data for presentation is outputted from different presenters' computers, unplugging/plugging the video signal line (such as the HDMI signal line) for several times between different computers is necessary, hence the video wire is damaged easily and the inconvenience is produced due to the conference being interrupted.

The kind of video conference system for wireless presentation mainly wirelessly transmits the video data outputted from the personal computer end to a display device and play the video data in the display device, but does not capture the video data of the presenter's face. Therefore, people who participate the video conference at far end through network cannot see the presenter's facial expression, and will have a lower sense of participation. Besides, even though the entire video conference is recorded as meeting minutes, the viewer will be unable to identify which presenter or questioner is speaking when the recording of the video conference is viewed again in the future. Therefore, it has become a prominent task for the industries to provide a video conference system for wireless presentation capable of combining the following data as one single combined video data: (1) the frame content of the presentation file; (2) the video data of presenter's face during the presentation process; (3) the presenter-marked image of the frame content of the presentation file during the presentation process.

SUMMARY OF THE INVENTION

The invention is directed to a video conference system, and particularly to a video conference system capable of combining video data.

According to one embodiment of the present invention, a video conference system is provided. The video conference system includes a transmitter device and a receiver device. The transmitter device includes a transmitter control unit, a transmitter input interface, a transmitter video circuit and a first wireless transmission module. The transmitter control unit is coupled to a video output port of an information system and receive a first video data from the video output port. The transmitter input interface is coupled to a first video source and receive a second video data from the first video source. The transmitter video circuit combines the first video data and the second video data as a combined video data. The first wireless transmission module transmits the combined video data to the receiver device. The receiver device, coupled to the display device, includes a second wireless transmission module. The second wireless transmission module receives the combined video data and transmits the combined video data to the display device.

According to another embodiment of the present invention, a video conference system is provided. The video conference system includes a transmitter device and a receiver device. The transmitter device includes a transmitter control unit, a transmitter input interface and a transmitter output interface. The transmitter control unit is coupled to a video output port of an information system and receive a combined video data from the video output port. The information system has an information system video circuit. The information system obtains a first video data when processing an input file data. The transmitter input interface is coupled to the transmitter control unit and a peripheral device and receive a user operation data from the peripheral device. The transmitter output interface is coupled to the information system and the transmitter output interface transmits the user operation data to the information system. The information system video circuit combines the first video data and the user operation data as the combined video data. The first wireless transmission module transmits the combined video data to the receiver device. The receiver device, coupled to a display device, includes a second wireless transmission module. The second wireless transmission module receives the combined video data and transmits the combined video data to the display device.

In comparison to existing technologies, the video conference system for wireless presentation of the present invention combines the frame content of the presentation file and the presenter's facial video data during the presentation process as a combined video data, and further outputs the combined video data to the receiver device at a far end conference room. The combined video data optionally includes the presenter-marked image of the frame content of the presentation file during the presentation process, such as the mouse curser trail inputted by the user. Thus, those who participate the video conference from a far end conference room through network can see the presenter's facial expression, and have a higher sense of participation. Additionally, when the recording of the entire video conference is viewed in the future, the viewer can clearly understand which presenter or questioner is speaking in each stage, and the completeness of the conference record can be greatly increased.

The above and other aspects of the invention will become better understood with regard to the following detailed description of the preferred but non-limiting embodiment (s). The following description is made with reference to the accompanying drawings.

DETAILED DESCRIPTION OF THE INVENTION

The objects, structures, features and functions of the present invention are disclosed in embodiments below.

Figure 1:
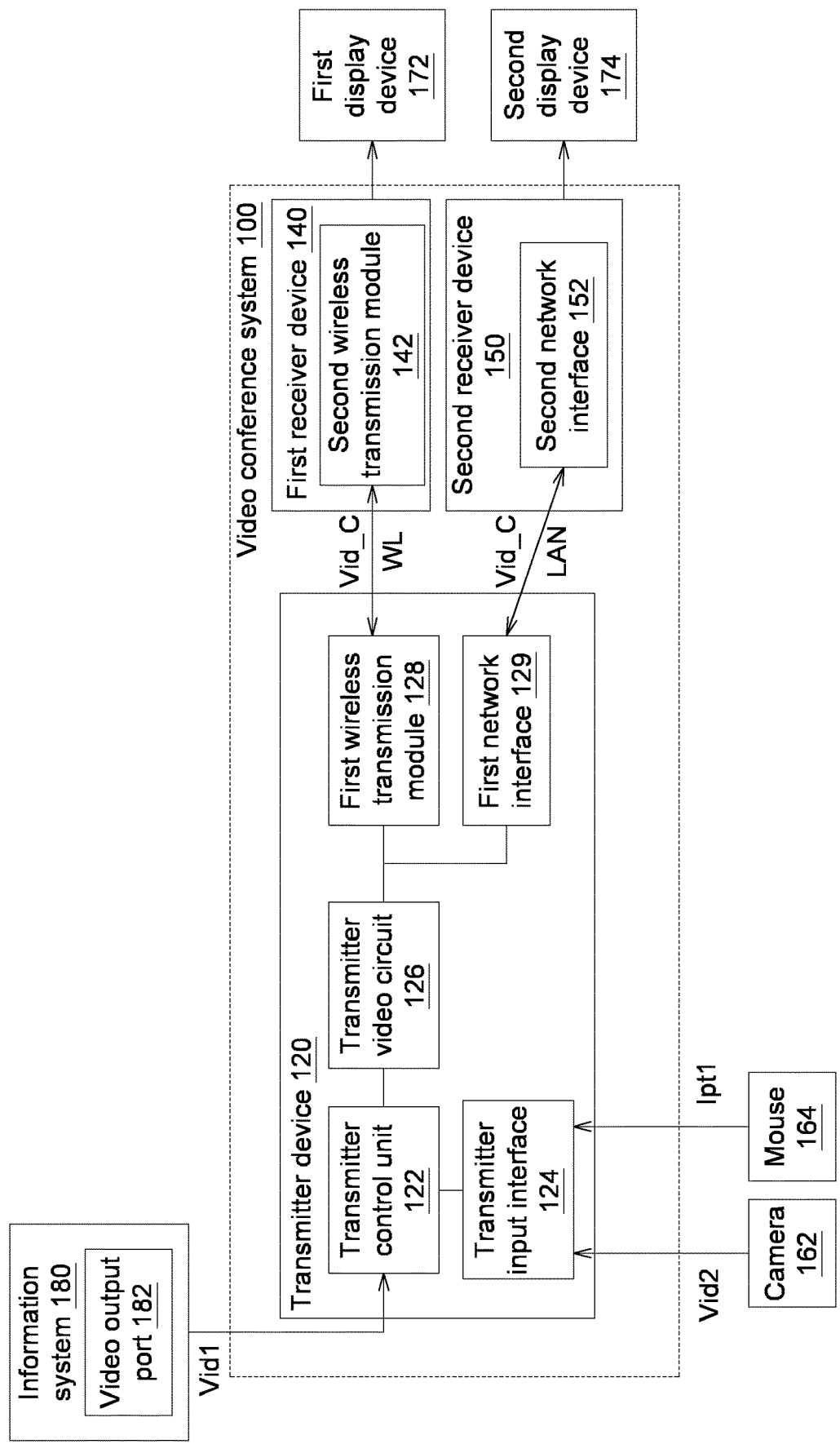
FIG. 1 is a block diagram of a video conference system according to a first embodiment of the present disclosure.

Referring to FIG. 1, a block diagram of a video conference system 100 according to a first embodiment of the present disclosure is shown. The video conference system 100 includes a transmitter device 120 and a first receiver device 140. The transmitter device 120 includes a transmitter control unit 122, a transmitter input interface 124, a transmitter video circuit 126 and a first wireless transmission module 128. The transmitter control unit 122 is coupled to a video output port 182 of an information system 180 and the transmitter control unit 122 receives a first video data Vid1 from the video output port 182. The transmitter input interface 124 is coupled to a first video source to receive a second video data Vid2 from the first video source. The transmitter video circuit 126 combines the first video data Vid1 and the second video data Vid2 as a combined video data Vid_C. The first wireless transmission module 128 transmits the combined video data Vid_C to the first receiver device 140. The first receiver device 140, coupled to the first display device 172, includes a second wireless transmission module 142. The second wireless transmission module 142 receives the combined video data Vid_C and transmits the combined video data Vid_C to the first display device 172.

In the present embodiment, the information system 180 is exemplified by a notebook computer, but the embodiment is not limited thereto. In the present embodiment, the video output port 182 is exemplified by one of video graphics array (VGA) output port, display port (DP), high-definition multimedia (HDMI) interface port and Type-C USB (Universal Serial Bus) interface port supporting video output function, but the embodiment is not limited thereto. When the video output port 182 of the information system 180 is an HDMI video port, the HDMI video port of the information system 180 reads the extended display identification data (EDID) code stored in the transmitter device 120. Only after the HDMI video port determines that the transmitter device 120 is a display device complying with the HDMI standards according to the received EDID code will the video output port 182 start to output the first video data Vid1 to the transmitter device 120 through the HDMI video port. On the other hand, when the video output port 182 of the information system 180 is a Type-C USB connection port, the transmitter device 120 is coupled to the Type-C USB connection port of the information system 180 through a connection line supporting the Type-C USB alternative mode.

The first video data Vid1 obtained by a notebook computer when processing a file data (such as Microsoft PowerPoint file) inputted by a user is shown on a display monitor of the notebook computer and outputted through the video output port 182.

Figure 2:
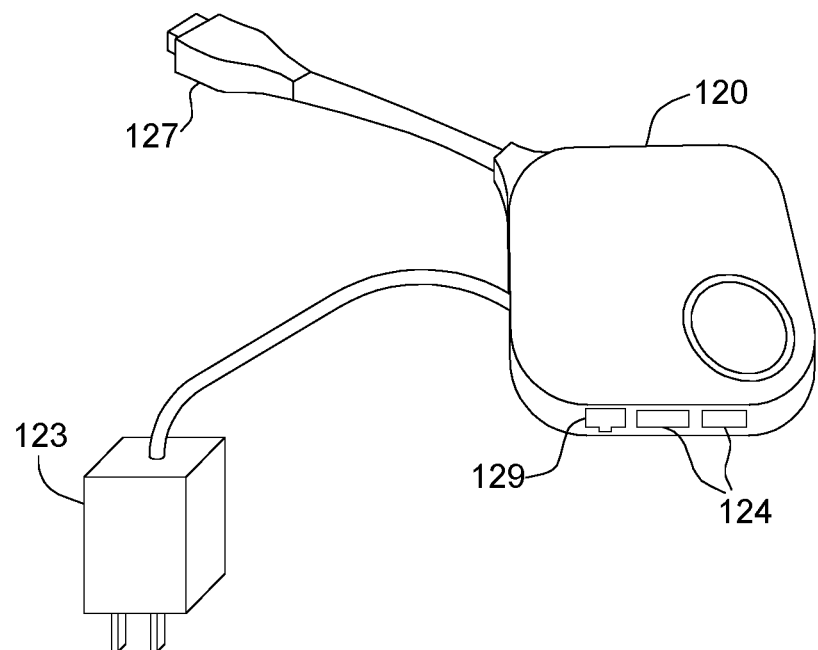
FIG. 2 is a schematic diagram of the appearance of the transmitter device of FIG. 1 according to the first embodiment of the present disclosure.

Refer to FIG. 2, a schematic diagram of the appearance of the transmitter device 120 of FIG. 1 according to the first embodiment of the present disclosure is shown. The transmitter device 120 has a video port connection line 127, a transmitter input interface 124 and a first network interface 129. To provide necessary power for the operation of the transmitter device 120, the transmitter device 120 optionally includes an independent external transformer 123 or a USB adaptor power line coupled to the USB port of the information system 180 to receive the power. The end of the video port connection line 127 has a video signal line adaptor (such as one of VGA, display port, HDMI interface port and Type-C USB interface port) through which the video port connection line 127 can be mechanically combined with the video output port 182 of the information system 180. The transmitter control unit 122 can be coupled to the video output port 182 of the information system 180 through the video port connection line 127 and receive a first video data Vid1 from the video output port 182.

In the first embodiment, the transmitter input interface 124 is exemplified by a USB interface port, but the transmitter input interface 124 is not limited thereto. As shown in FIG. 1, the USB interface used as the transmitter input interface 124 can be coupled to a USB interface camera 162 with an in-built microphone and receive the second video data Vid2 including image and voice from the USB interface camera 162. For example, when the camera 162 captures the image of a presenter's face, the captured second video data Vid2 is the video data of the presenter's face, which includes the presenter's facial image and the presenter's speech during the relevant presentation process. The transmitter video circuit 126 of the transmitter device 120 combines the first video data Vid1 and the second video data Vid2 as a combined video data Vid_C, and then outputs the combined video data Vid_C to the first wireless transmission module 128. The first wireless transmission module 128 transmits the combined video data Vid_C to the second wireless transmission module 142 of the first receiver device 140. The second wireless transmission module 142 receives the combined video data Vid_C, and then transmits the combined video data Vid_C to the first display device 172 coupled to the first receiver device 140.

In the first embodiment, the transmitter device 120 optionally includes a first network interface 129. The transmitter video circuit 126 combines the first video data Vid1 and the second video data Vid2 as a combined video data Vid_C and then outputs the combined video data Vid_C to the first network interface 129. Through the Internet, the first network interface 129 transmits the combined video data Vid_C to the second network interface 152 of the second receiver device 150 at far end, such that the function of remote video conference between the transmitter device 120 and the second receiver device 150 at far end which is located at a distinct location can be achieved. The transmitter device 120 can transmit the combined video data Vid_C to the second receiver device 150 at far end through the first network interface 129 and the second network interface 152.

In the first embodiment, the transmitter input interface 124 is optionally coupled to the peripheral device and receive the first user operation data Ipt1 from the peripheral device. In the present embodiment, the peripheral device is exemplified by the mouse 164, and the first user operation data Ipt1 is exemplified by the mouse movement data inputted by the user, but the embodiment is not limited thereto. Other possible embodiments of the peripheral device include handwriting pad, touch pad or other device that can operate the curser trail. After the user operates the mouse 164 to input the curser trail, the transmitter video circuit 126 combines the first video data Vid1, the second video data Vid2 (such as the video data of the presenter's face captured by the camera 162) and the first user operation data Ipt1 (such as the mouse movement data) as a combined video data Vid_C.

In the first embodiment, the transmitter video circuit 126 optionally includes a display processor and an audio processing circuit which respectively perform the combining operation in the video part and the combining operation in the audio part for the combined video data Vid_C. The display processor includes a scalar controller whose image combining circuit combines at least two of the video part of the first video data Vid1, the video part of the second video data Vid2 and the video part of the first user operation data Ipt1 as the video part of the combined video data Vid_C. The audio processing circuit combines the audio part of the first video data Vid1 and the audio part of the second video data Vid2 as the audio part of the combined video data Vid_C. Then, the first wireless transmission module 128 or the first network interface 129 outputs the combined video data Vid_C to the first receiver device 140 or the second receiver device 150.

Figure 3:
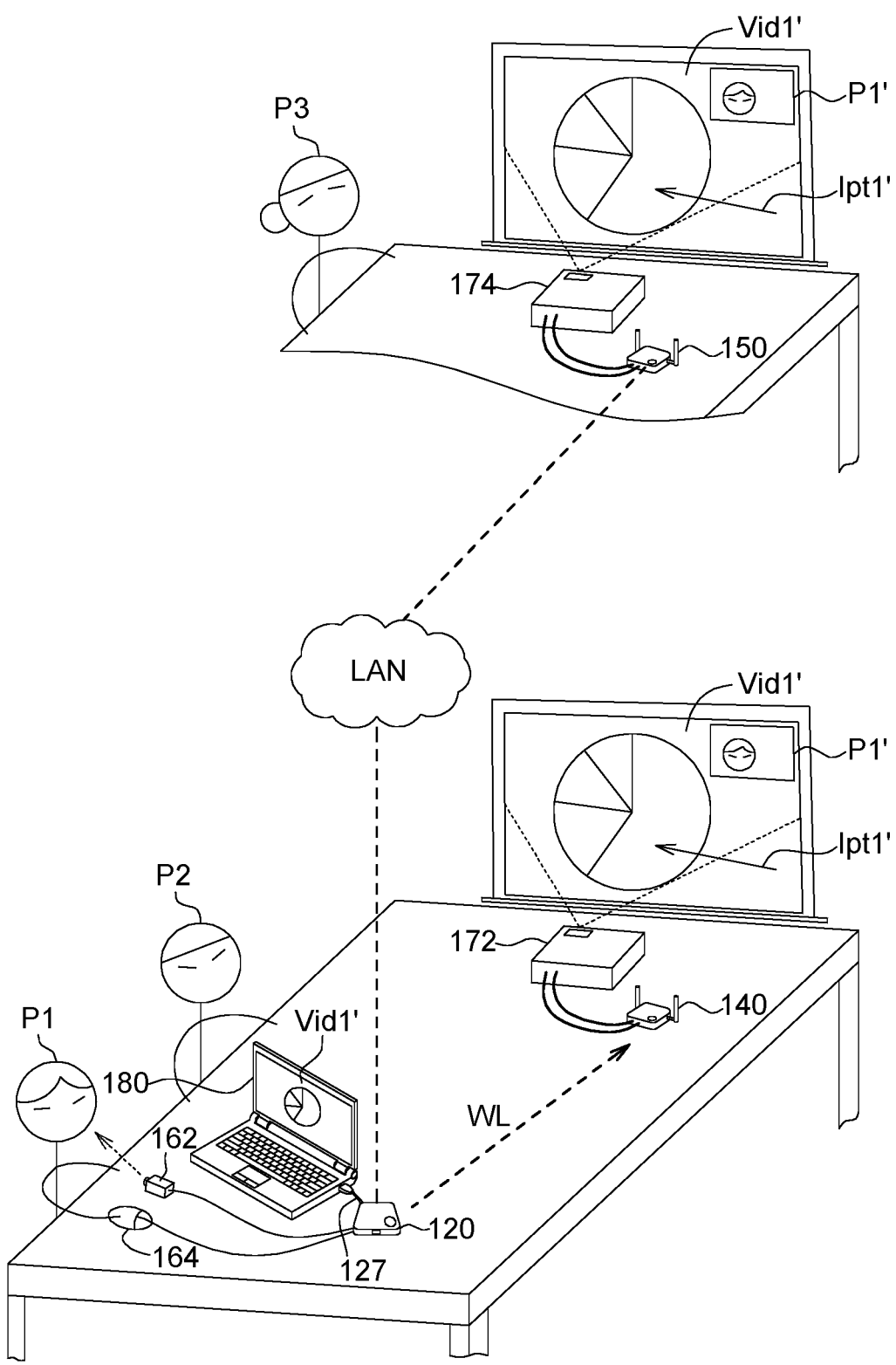
FIG. 3 is a schematic diagram of an application scenario according to the first embodiment of the present disclosure.

Refer to FIG. 3, which shows an application scenario according to the first embodiment of the present disclosure. The scenarios shown in FIG. 3 include (1) the first user P1 operates the information system 180 to read a presentation file to generate a first video data Vid1, the monitor of the information system 180 shows a first video data frame Vid1', and the information system 180 outputs the first video data Vid1 to the transmitter device 120 through the video output port 182; (2) the transmitter input interface 124 of the transmitter device 120 is connected to the camera 162 and the mouse 164, the first user P1 operates the mouse 164 to input the mouse movement data, and the camera 162 captures the image of the face of the first user P1 to obtain a facial video data of the first user P1 (including the facial image and the presenter's speech). Under such scenarios, the transmitter video circuit 126 combines the first video data Vid1, the facial video data of the first user P1 and the mouse movement data as a combined video data Vid_C, and then transmits the combined video data Vid_C to the first receiver device 140 at near end (such as at the same conference room) through the wireless transmission WL and transmits the combined video data Vid_C to the second receiver device 150 at far end (such as at a different conference room in another building) through the Internet transmission LAN. The first receiver device 140 outputs the combined video data Vid_C to the first display device 172 at near end, and the second receiver device 150 outputs the combined video data Vid_C to the second display device 174 at far end. As shown in FIG. 3, the displayed frame of the first display device 172 at near end and the displayed frame of the second display device 174 at far end both show the first video data frame Vid1', the first user facial video frame P1' and the first mouse curser trail Ipt1'. The conference participants at near end and at far end can real-timely understand that the first user P1 is giving presentation, and those who view the recording of the video conference in the future will also understand that the first user P1 is giving presentation at this stage of the video conference.

Figure 4:
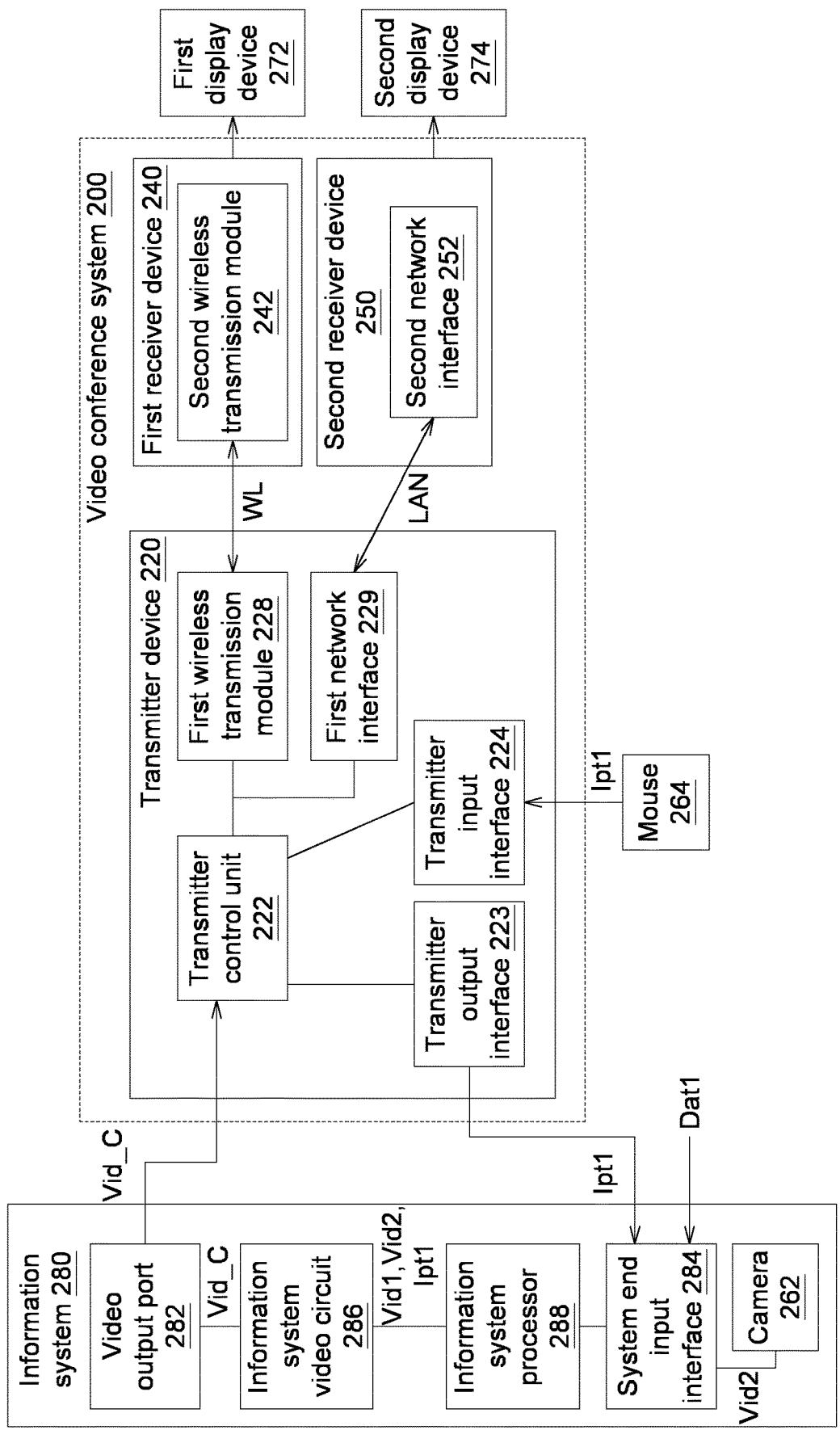
FIG. 4 is a block diagram of a video conference system according to a second embodiment of the present disclosure.

Referring to FIG. 4, a block diagram of a video conference system 200 according to a second embodiment of the present disclosure is shown. The video conference system 200 includes a transmitter device 220 and a first receiver device 240. The transmitter device 220 includes a transmitter control unit 222, a transmitter input interface 224, a transmitter output interface 223 and a first wireless transmission module 228. The transmitter control unit 222 is coupled to a video output port 282 of an information system 280 and receives the combined video data Vid_C from the video output port 282. The information system 280 has an information system video circuit 286, and obtains a first video data Vid1 when processing a file data Dat1 (such as Microsoft PowerPoint file) inputted by a user. The transmitter input interface 224 is coupled to the transmitter control unit 222 and is coupled to the peripheral device (such as the mouse 264) to receive a first user operation data Ipt1 from the peripheral device. The transmitter output interface 223 is coupled to the information system 280, and the transmitter output interface 223 transmits the first user operation data Ipt1 to the information system 280. The information system video circuit 286 combines the first video data Vid1 and the first user operation data Ipt1 as a combined video data Vid_C. The first wireless transmission module 228 transmits the combined video data Vid_C to the first receiver device 240. The first receiver device 240 includes a second wireless transmission module 242. The second wireless transmission module 242 receives the combined video data Vid_C and transmits the combined video data Vid_C to the first display device 272.

In the present embodiment, the information system 280 is exemplified by a notebook computer, but the embodiment is not limited thereto. In the present embodiment, the video output port 282 is exemplified by one of VGA output port, display port (DP), high-definition multimedia interface (HDMI) port and Type-C USB interface port supporting video output function that are commonly seen in the market, but the embodiment is not limited thereto. The first video data Vid1 is obtained by a notebook computer when processing a file data Dat1 inputted by a user input. The file data Dat1 is shown on a display monitor of the notebook computer and is outputted through the video output port 282.

Figure 5:
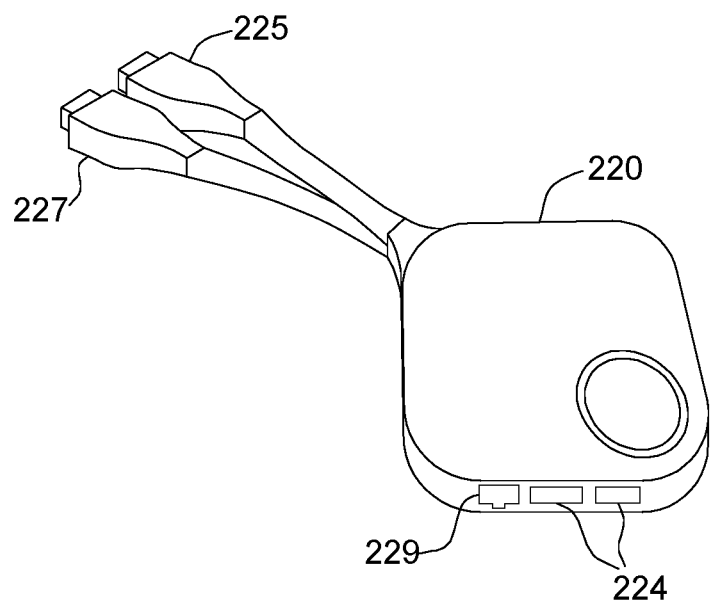
FIG. 5 is a schematic diagram of the appearance of the transmitter device of FIG. 4 according to the second embodiment of the present disclosure.

Referring to FIG. 5, a schematic diagram of the appearance of the transmitter device 220 of FIG. 4 according to the second embodiment of the present disclosure is shown. The transmitter device 220 has a video port connection line 227, an interface port connection line 225, a transmitter input interface 224 and a first network interface 229. The end of the video port connection line 227 has a video signal line adaptor (such as one of VGA, display port, HDMI interface port and Type-C USB interface port connector) through which the video port connection line 227 can be mechanically combined with the video output port 282 of the information system 280. The transmitter control unit 222 can be coupled to the video output port 282 of the information system 280 through the video port connection line 227 to receive the combined video data Vid_C from the video output port 282. The end of the interface port connection line 225 has a data line adaptor (such as the USB adaptor) through which the interface port connection line 225 can be mechanically combined with the system end input interface 284 of the information system 280 to transmit the first user operation data Ipt1.

In the second embodiment, the system end input interface 284 is exemplified by a USB interface and the system end video source is exemplified by a network camera 262 disposed on the monitor of the notebook computer, but the transmitter input interface 224 is not limited thereto. The USB interface used as the system end input interface 284 can be coupled to a network camera 262 with an in-built microphone, such that the network camera 262 can be used as a system end video source. The USB interface used as the system end input interface 284 can receive a second video data Vid2 including image and voice from the network camera 262. The camera 262 transmits the second video data Vid2 to the information system video circuit 286 through the USB interface port. For example, when the camera 262 captures the image of the presenter's face, the captured second video data Vid2 is the video data of the presenter's face. The second video data Vid2 includes the presenter's facial image and the presenter's speech during the presentation process. The information system video circuit 286 of the information system 280 combines the first video data Vid1 and the second video data Vid2 as a combined video data Vid_C, and then outputs the combined video data Vid_C to the transmitter device 220 through the video output port 282. The transmitter device 220 further transmits the combined video data Vid_C to the first receiver device 240. Lastly, the combined video data Vid_C is transmitted to the first display device 272 coupled to the first receiver device 240.

In the second embodiment, the transmitter device 220 optionally includes a first network interface 229. The transmitter control circuit also outputs the combined video data Vid_C to the first network interface 229. Through the Internet, the first network interface 229 transmits the combined video data Vid_C to the second network interface 252 of the second receiver device 250 at far end, such that the function of remote video conference between the transmitter device 220 and the second receiver device 250 at far end which is located at a distinct location can be achieved. The transmitter device 220 can transmit the combined video data Vid_C to the second receiver device 250 at far end through the first network interface 229 and the second network interface 252.

In the second embodiment, the system end input interface 284 is optionally coupled to the peripheral device to receive the first user operation data Ipt1 from the peripheral device. In the present embodiment, the peripheral device is exemplified by the mouse 264, and the first user operation data Ipt1 is exemplified by the mouse movement data inputted by the user, but the embodiment is not limited thereto. Other possible embodiments of the peripheral device include handwriting pad, touch pad or other device that can operate the curser trail. After the user operates the mouse 264 to input the curser trail, the information system video circuit 286 combines the first video data Vid1 (such as Microsoft Power Point file), the second video data Vid2 (such as the video data of the presenter's face captured by the camera 262) and the first user operation data Ipt1 (such as the mouse movement data) as a combined video data Vid_C.

In the second embodiment, the information system video circuit 286 optionally includes the display processor and the audio processing circuit which respectively perform the combining operation in the video part and the combining operation in the audio part for the combined video data Vid_C. The display processor includes a graphic processing unit (GPU) whose image combining circuit combines at least two of the video part of the first video data Vid1, the video part of the second video data Vid2 and the video part of the first user operation data Ipt1 as the video part of the combined video data Vid_C. The audio processing circuit combines the audio part of the first video data Vid1 and the audio part of the second video data Vid2 as the audio part of the combined video data Vid_C. Then, the combined video data Vid_C is outputted to the transmitter control unit 222 through the video output port 282 of the information system 280.

Figure 6A:
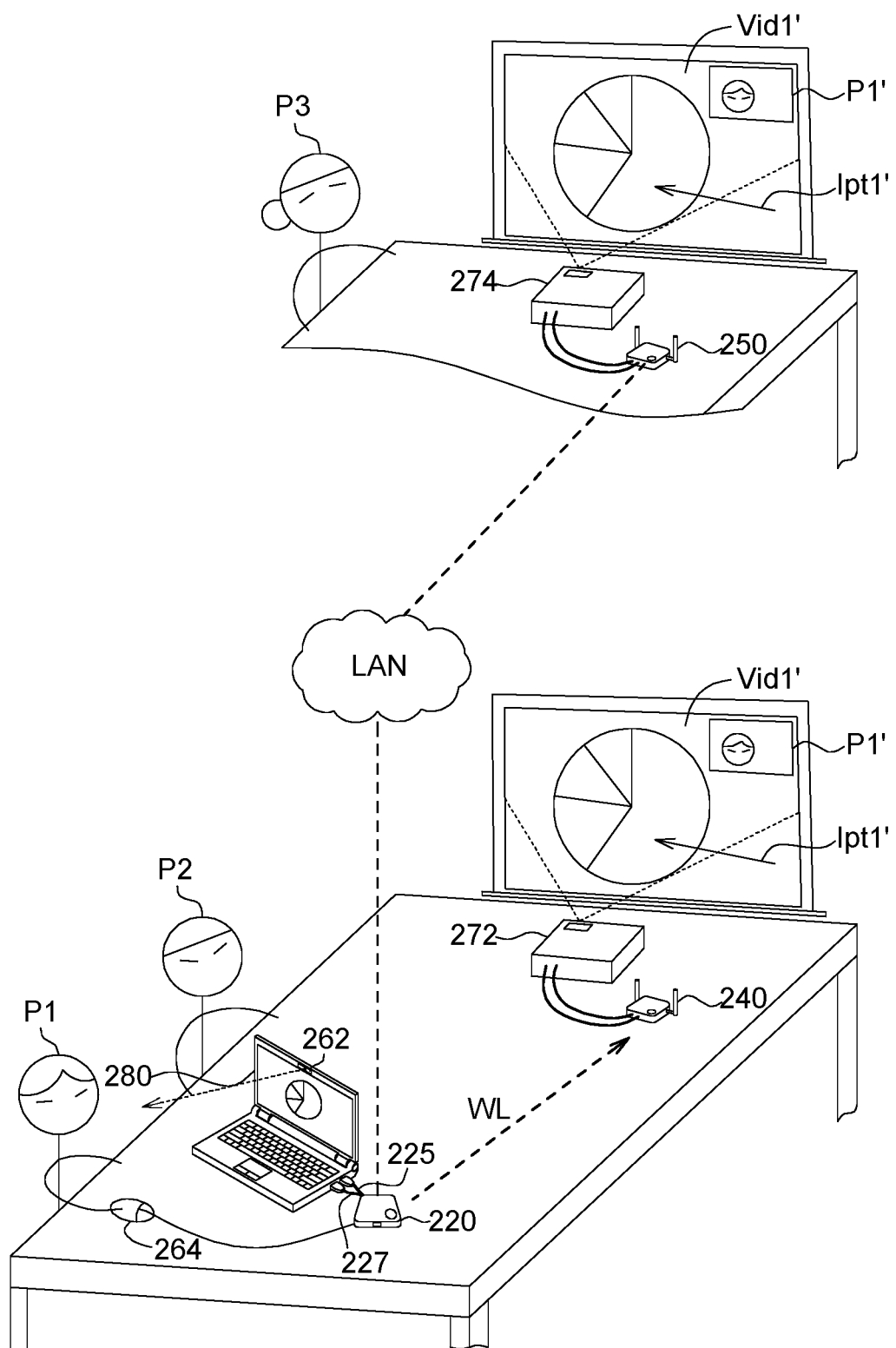
FIG. 6A is a schematic diagram of an application scenario according to the second embodiment of the present disclosure.
Figure 6B:
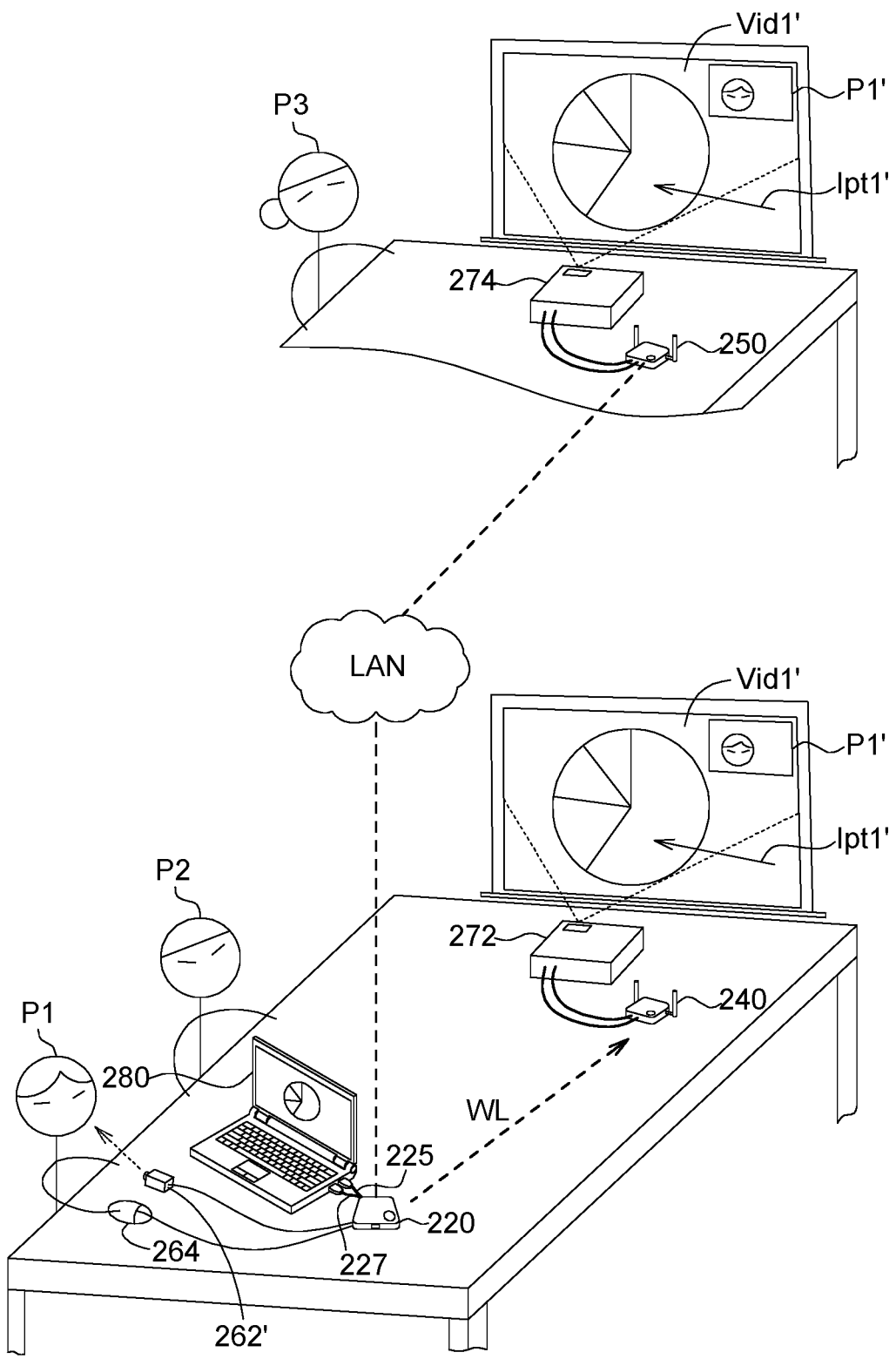
FIG. 6B is a schematic diagram of another application scenario according to the second embodiment of the present disclosure.

Refer to FIG. 6A and FIG. 6B, which shows two application scenarios according to the second embodiment of the present disclosure. The scenarios of FIG. 6A include (1) the first user P1 operates the information system 280 to read a file data Dat1, and the information system processor 288 processes the file data Dat1 (such as Microsoft PowerPoint file) to generate a first video data Vid1; (2) the camera 262 in-built in the information system 280 (such as the network camera 262 disposed on the monitor of a notebook computer) captures the image of the face of the first user P1 to obtain a facial video data of the first user P1; and (3) the mouse 264 is connected to the transmitter input interface 224 of the transmitter device 220, and the first user P1 operates the mouse 264 to input the mouse movement data. Under such scenarios, the transmitter output interface 223 firstly transmits the mouse movement data to the system end input interface 284 through the interface port connection line 225, then the information system video circuit 286 combines the first video data Vid1, the facial video data of the first user P1 and the mouse movement data as a combined video data Vid_C. The information system 280 firstly transmits the combined video data Vid_C to the transmitter device 220 through the video output port 282, then the transmitter device 220 transmits the combined video data Vid_C to the first receiver device 240 at near end through the wireless transmission WL and transmits the combined video data Vid_C to the second receiver device 250 at far end through the Internet transmission LAN. The first receiver device 240 outputs the combined video data Vid_C to the first display device 272 at near end, and the second receiver device 250 outputs the combined video data Vid_C to the second display device 274 at far end. As shown in FIG. 6A, the displayed frame of the first display device 272 at near end and the displayed frame of the second display device 274 at far end both show the first video data frame Vid1', the first user facial video frame P1' and the first mouse curser trail Ipt1'.

Similarly, the scenarios of FIG. 6B include (1) the first user P1 operates the information system 280 to read a file data Dat1 which is inputted, and the information system processor 288 processes the file data Dat1 (such as Microsoft PowerPoint file) to generate a first video data Vid1; (2) the camera 262' connected to the transmitter input interface 224 of the transmitter device 220 to capture the image of the face of the first user P1 to obtain a facial video data of the first user P1; and (3) the mouse 264 is connected to the transmitter input interface 224 of the transmitter device 220, and the first user P1 operates the mouse 264 to input the mouse movement data. Under such scenarios, the transmitter output interface 223 firstly transmits the facial video data of the first user P1 and the mouse movement data to the system end input interface 284 through the interface port connection line 225, then the information system video circuit 286 combines the first video data Vid1, the facial video data of the first user P1 and the mouse movement data as a combined video data Vid_C. The information system 280 firstly transmits the combined video data Vid_C to the transmitter device 220 through the video output port 282, then the transmitter device 220 transmits the combined video data Vid_C to the first receiver device 240 at near end through the wireless transmission WL and transmits the combined video data Vid_C to the second receiver device 25 at far end through the Internet transmission LAN. The first receiver device 240 outputs the combined video data Vid_C to the first display device 272 at near end, and the second receiver device 250 outputs the combined video data Vid_C to the second display device 274 at far end. As shown in FIG. 6B, the displayed frame of the first display device 272 at near end and the displayed frame of the second display device 274 at far end both show the first video data frame Vid1', the first user facial video frame P1' and the first mouse curser trail Ipt1'.

Figure 7:
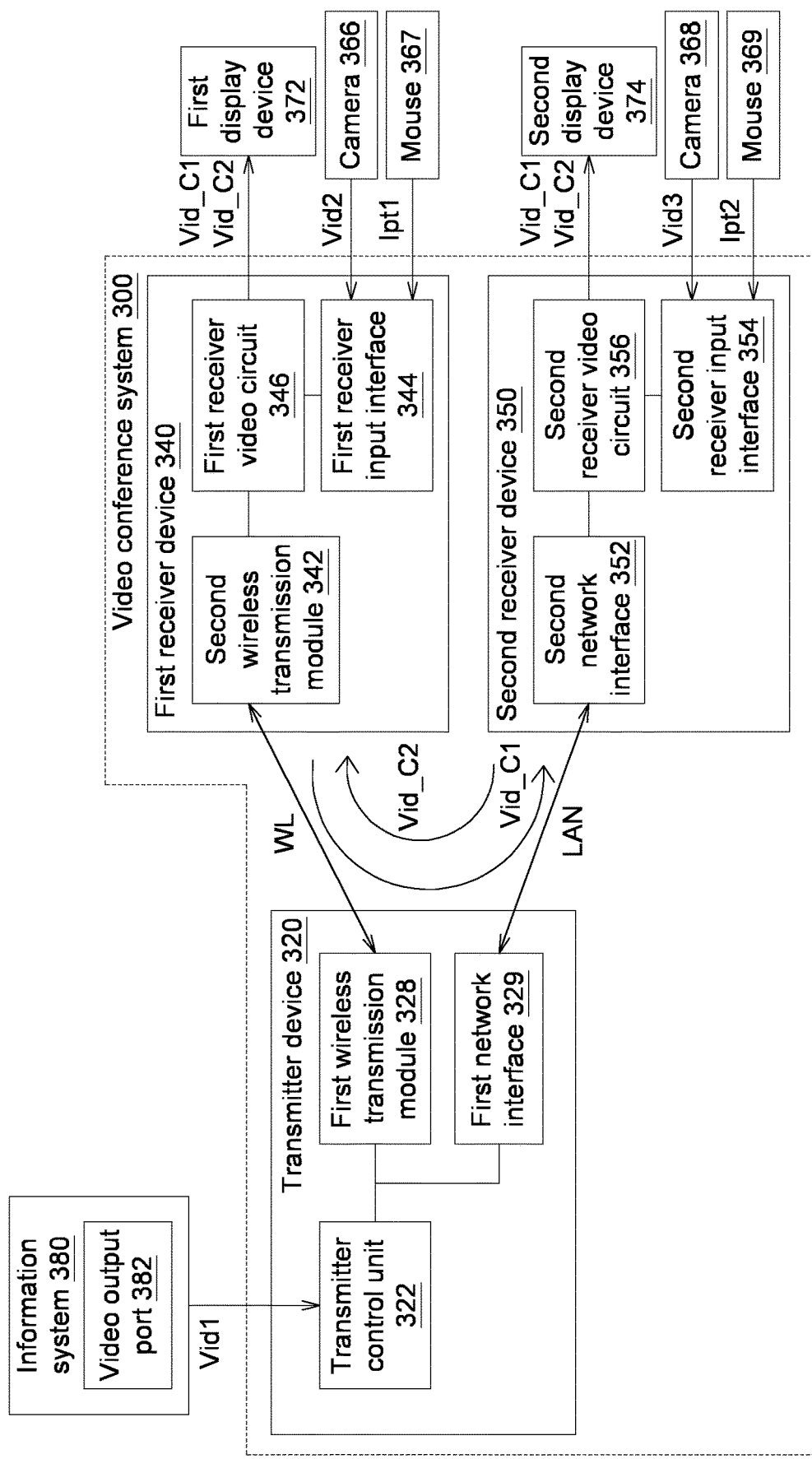
FIG. 7 is a block diagram of a video conference system according to a third embodiment of the present disclosure.

Referring to FIG. 7, a block diagram of a video conference system 300 according to a third embodiment of the present disclosure is shown. The video conference system 300 includes a transmitter device 320 and a first receiver device 340. The transmitter device 320 includes a transmitter control unit 322, a first network interface 329 and a first wireless transmission module 328. The transmitter control unit 322 is coupled to the video output port 382 of the information system 380 to receive a first video data Vid1 from the video output port 382. The first wireless transmission module 328 transmits the first video data Vid1 to the first receiver device 340. The first network interface 329 can communicate with the second network interface 352 of the second receiver device 350 at far end through the Internet transmission LAN. By doing so, the transmitter device 320 can output the first video data Vid1 to the second receiver device 350 at far end through the first network interface 329 and the second network interface 352, such that the function of remote video conference between the transmitter device 320 and the second receiver device 350 at far end which is located at a distinct location can be achieved.

The first receiver device 340 includes a second wireless transmission module 342, a first receiver input interface 344 and a first receiver video circuit 346. The second wireless transmission module 342 is used to establish wireless transmission WL with the first wireless transmission module 328. In the third embodiment, the first receiver input interface 344 is exemplified by a USB interface, but the first receiver input interface 344 is not limited thereto. As shown in FIG. 7, the USB interface used as the first receiver input interface 344 can be coupled to a USB interface camera 366 with an in-built microphone to receive a second video data Vid2 including image and voice from the USB interface camera 366. For example, when the camera 366 captures the image of the face of the third user P3, the captured second video data Vid2 is the facial video data of the third user P3. The second video data Vid2 includes the facial image and the speech of the third user P3 during the presentation process.

In the third embodiment, the first receiver input interface 344 is optionally coupled to the peripheral device to receive the first user operation data Ipt1 of the third user from the peripheral device. In the present embodiment, the peripheral device is exemplified by the mouse 367 and the first user operation data Ipt1 is exemplified by the mouse movement data inputted by the user, but the embodiment is not limited thereto. Other possible implementation of the peripheral device includes handwriting pad, touch pad or other device that can operate the curser trail.

The first receiver video circuit 346 combines the first video data Vid1 transmitted by the transmitter device 320, the second video data Vid2 (such as the facial video data of the third user P3 captured by the camera 366) and the first user operation data Ipt1 generated by the mouse 367 operated by the third user (such as the mouse movement data) as a first combined video data Vid_C1. The first receiver video circuit 346 outputs the first combined video data Vid_C1 to the first display device 372 coupled to the first receiver device 340, and outputs the first combined video data Vid_C1 to the transmitter device 320 through the wireless transmission WL between the second wireless transmission module 342 and the first wireless transmission module 328. The transmitter device 320 further outputs the first combined video data Vid_C1 to the second receiver device 350 through the Internet transmission LAN between the first network interface 329 and the second network interface 352.

Similarly, the second receiver device 350 includes a second network interface 352, a second receiver input interface 354 and a second receiver video circuit 356. The second receiver input interface 354 can be implemented by a USB interface. As shown in FIG. 7, the USB interface used as the second receiver input interface 354 can be coupled to a USB interface camera 368 with an in-built microphone to receive a third video data Vid3 including image and voice from the USB interface camera 368. For example, when the camera 368 captures the image of the face of the fourth user P4, the captured third video data Vid3 is the facial video data of the fourth user P4. The third video data Vid3 includes the facial image and the speech of the fourth user P4 during the presentation process. The second receiver input interface 354 is optionally coupled to the peripheral device (such as the mouse 369) to receive a second user operation data Ipt2 of the fourth user P4 (such as the mouse movement data inputted through the mouse 369 operated by the user) received from the peripheral device.

The second receiver video circuit 356 combines the first video data Vid1 transmitted from the transmitter device 320, the third video data Vid3 (such as the facial video data of the fourth user P4 captured by the camera 368) and the second user operation data Ipt2 generated through the mouse 369 operated by the fourth user P4 (such as the mouse movement data) as a second combined video data Vid_C2. The second receiver video circuit 356(1) outputs the second combined video data Vid_C2 to the second display device 374, and outputs the second combined video data Vid_C2 to the transmitter device 320 through the Internet transmission LAN. The transmitter device 320 further outputs the second combined video data Vid_C2 to the first receiver device 340 through the wireless transmission WL.

In the present embodiment, the information system 380 is exemplified by a notebook computer, but the information system 380 is not limited thereto. In the present embodiment, the video output port 382 is exemplified by one of VGA output port, display port (DP), high-definition multimedia (HDMI) interface port and Type-C USB interface port supporting video output function that are commonly seen in the market, but the embodiment is not limited thereto. The first video data Vid1 is obtained by a notebook computer when processing a user input file data. The first video data Vid1 is shown on a display monitor of the notebook computer and outputted through the video output port 382.

Figure 8:
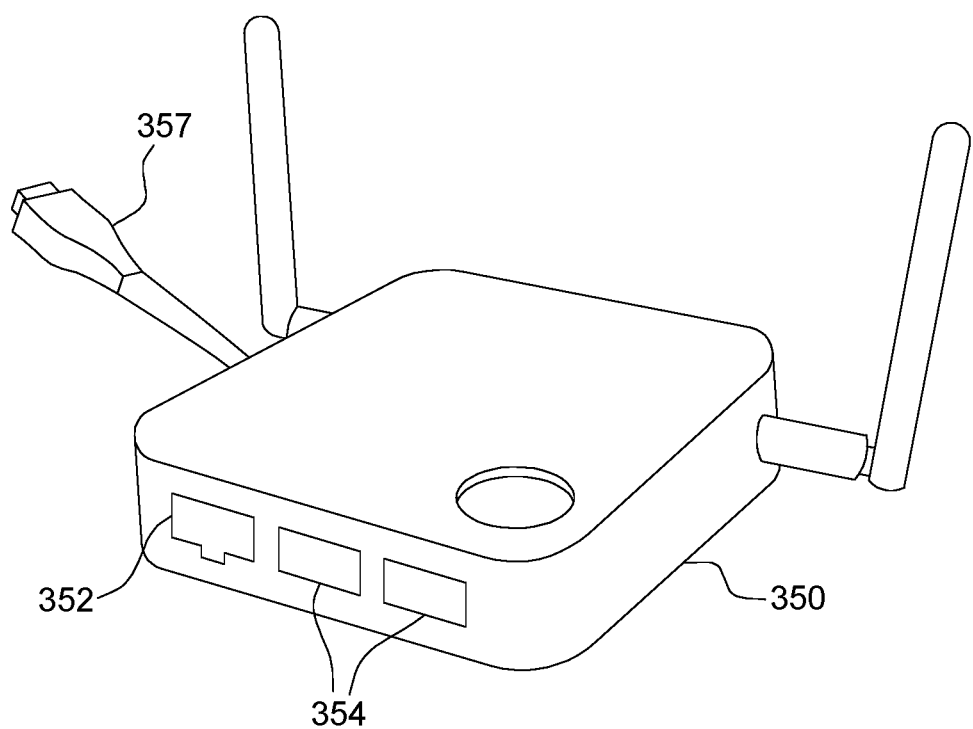
FIG. 8 is a schematic diagram of the appearance of the receiver device of FIG. 7 according to the third embodiment of the present disclosure.

Referring to FIG. 8, a schematic diagram of the appearance of the receiver device 350 of FIG. 7 according to the third embodiment of the present disclosure is shown. The second receiver device 350 has a video port connection line 357, a second receiver input interface 354 and a second network interface 352. The end of the video port connection line 357 has a video signal line adaptor (such as one of VGA, display port, HDMI interface port and Type-C USB interface port) through which the video port connection line 357 can be mechanically combined with the video input port of the second display device 374. The receiver control unit can output the second combined video data Vid_C2 to the video input port of the second display device 374 through the video port connection line 357. The appearance of the first receiver device 340 is similar to the appearance of the second receiver device 350, and the main difference lies in that the first receiver device 340 does not have the second network interface 352.

In the third embodiment, the first receiver video circuit 346 optionally includes a display processor and an audio processing circuit, which respectively perform the combining operation in the video part and the combining operation in the audio part for the first combined video data Vid_C1. The display processor includes a scalar controller whose image combining circuit combines at least two of the video parts of the video part of the first video data Vid1, the video part of the second video data Vid2 and the video part of the first user operation data Ipt1 inputted by the third user P as the video part of the first combined video data Vid_C1. The audio processing circuit combines the audio part of the first video data Vid1 and the audio part of the second video data Vid2 as the audio part of the first combined video data Vid_C1. By the same analogy, the second receiver video circuit 356 also optionally includes a display processor and an audio processing circuit, which respectively perform the combining operation in the video part and the combining operation in the audio part for the second combined video data Vid_C2. The display processor includes the scalar controller whose image combining circuit combines at least two of the video parts of the video part of the first video data Vid1, the video part of the third video data Vid3 and the video part of the second user operation data Ipt2 inputted by the fourth user P4 as the video part of the second combined video data Vid_C2. The audio processing circuit combines the audio part of the first video data Vid1 and the audio part of the third video data Vid3 as the audio part of the second combined video data Vid_C2.

As shown in FIG. 7, the first receiver device 340 not only has the first combined video data Vid_C1 generated by the first receiver video circuit 346, but also receives the second combined video data Vid_C2 generated by the second receiver video circuit 356 through the wireless transmission WL and the Internet transmission LAN of the transmitter device 320. Therefore, the first receiver device 340 optionally outputs both of the two combined frames to the first display device 372 by way of split frames or picture-in-picture frame or the first receiver device 340 optionally outputs one of the two combined frames to the first display device 372. Similarly, the second receiver device 350 not only has the second combined video data Vid_C2 generated by the second receiver video circuit 356, but also receives the first combined video data Vid_C1 generated by the first receiver video circuit 346 through the wireless transmission WL and the Internet transmission LAN of the transmitter device 320. Therefore, the second receiver device 350 optionally outputs both of the two combined frames to the second display device 374 by way of split frames or picture-in-picture frame or the second receiver device 350 optionally outputs only one of the two combined frames to the second display device 374.

Figure 9:
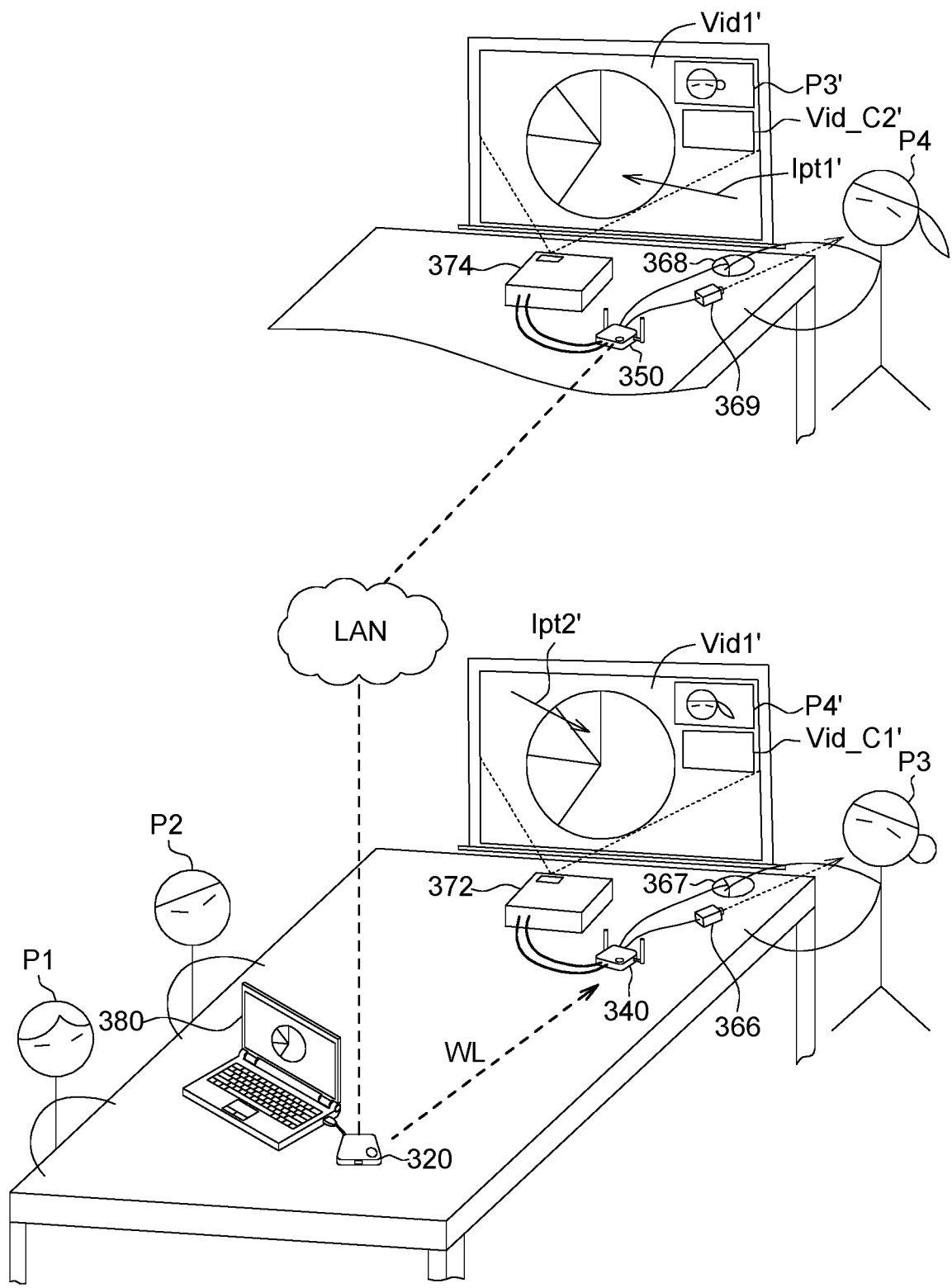
FIG. 9 is a schematic diagram of an application scenario of according to the third embodiment of the present disclosure.

Refer to FIG. 9, which shows an application scenario of according to the third embodiment of the present disclosure. The scenarios of FIG. 9 include (1) the first user P1 operates the information system 380 to read a presentation file to generate a first video data Vid1, the monitor of the information system 380 shows the first video data frame Vid1', and the information system 380 outputs the first video data Vid1 to the transmitter device 320 through the video output port 382; (2) the first receiver input interface 344 of the first receiver device 340 is connected to the camera 366 and the mouse 367, the third user P3 operates the mouse 367 to input the mouse movement data, and the camera 366 captures the image of the face of the third user P3 to obtain the second video data Vid2 which is the facial video data (including the facial image and the presenter's speech) of the third user P3; and (3) the second receiver input interface 354 of the second receiver device 350 is connected to the camera 368 and the mouse 369, the fourth user P4 operates the mouse 369 to input the mouse movement data, and the camera 368 captures the image of the face of the fourth user P4 to obtain a third video data Vid3 which is the facial video data of the fourth user P4. Under such scenarios, the first receiver video circuit 346 combines the first video data Vid1, the facial video data of the third user P3 and the mouse movement data inputted by the third user P as a first combined video data Vid_C1. The first receiver video circuit 346 outputs the first combined video data Vid_C1 to the first display device 372, and the first receiver video circuit 346 transmits the first combined video data Vid_C1 to the second receiver device 350 through the wireless transmission WL and the Internet transmission LAN of the transmitter device 320. Similarly, the second receiver video circuit 356 combines the first video data Vid1, the facial video data of the fourth user P4 and the mouse movement data inputted by the fourth user P4 as a second combined video data Vid_C2. The second receiver video circuit 356 outputs the second combined video data Vid_C2 to the second display device 374 at far end, and the second receiver video circuit 356 transmits the second combined video data Vid_C2 to the first receiver device 340 through the wireless transmission WL and the Internet transmission LAN of the transmitter device 320.

Figure 10A:
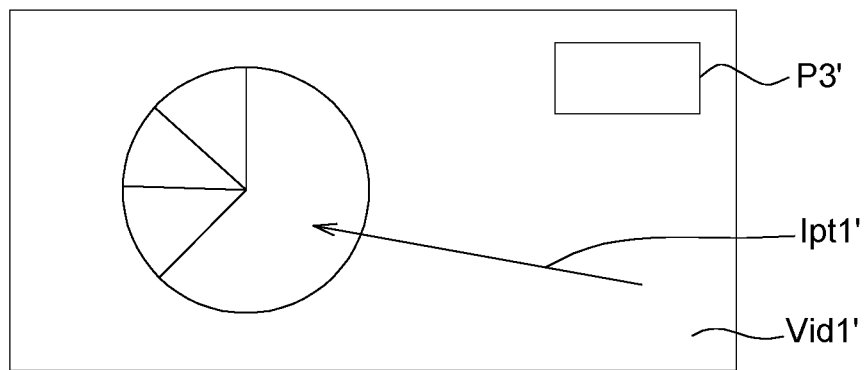
FIG. 10A is a schematic diagram of a displayed frame of a second display device corresponding to a first combined video data according to the third embodiment of the present disclosure.
Figure 10B:
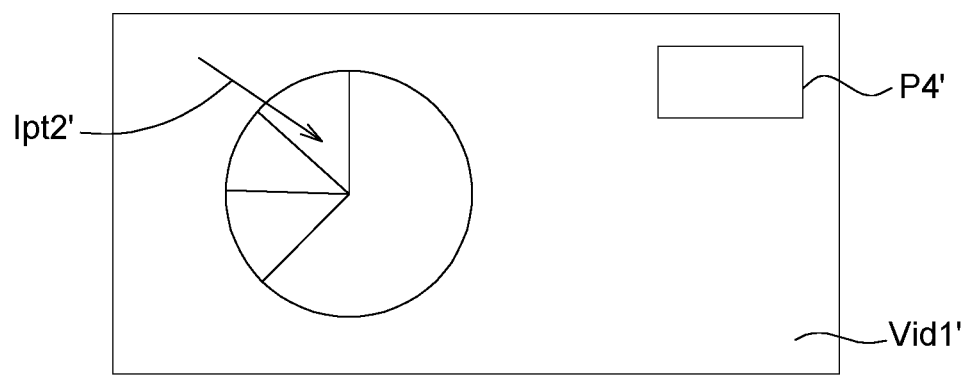
FIG. 10B is a schematic diagram of a displayed frame of a first display device corresponding to a second combined video data according to the third embodiment of the present disclosure.

Refer to FIG. 10A, which shows a schematic diagram of a display frame Vid_C1' of the second display device 374 when the second display device 350 optionally outputs only the first combined video data Vid_C1 and the second display device 374 only shows the first combined video data Vid_C1. As shown in FIG. 10A, when the second display device 374 only shows the first combined video data Vid_C1, the display frame Vid_C1' of the second display device 374 includes a first video data frame Vid1', a third user facial video frame P3' and a first mouse curser trail Ipt1'. Refer to FIG. 10B, which shows a schematic diagram of a display frame Vid_C2' of the second display device 374 when the first receiver device 340 optionally outputs only the second combined video data Vid_C2 which makes the first display device 372 only shows the second combined video data Vid_C2. As shown in FIG. 10B, when the first display device 372 only shows the second combined video data Vid_C2, the display frame Vid_C2' of the first display device 372 includes a first video data frame Vid1', a fourth user facial video frame P4' and a second mouse curser trail Ipt2'.

Figure 11A:
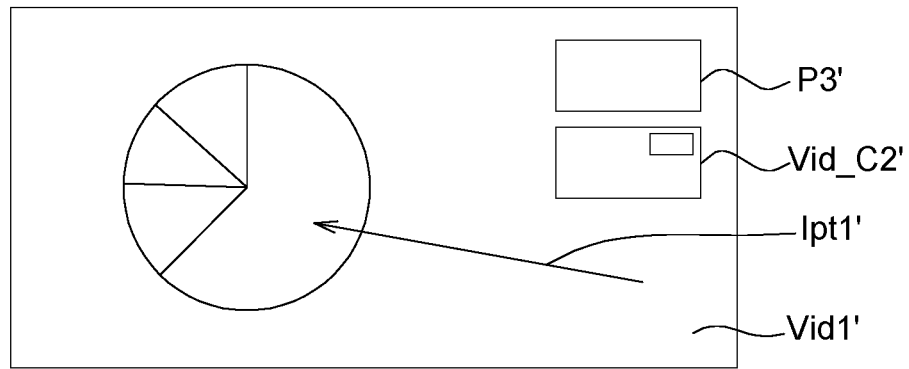
FIG. 11A is a schematic diagram of a picture-in-picture frame of a second display device corresponding to a first combined video data and a second combined video data according to the third embodiment of the present disclosure.

Refer to FIG. 11A, which shows a schematic diagram of a picture-in-picture frame of the second display device 374 when the second receiver device 350 optionally outputs both of the first combined video data Vid_C1 and the second combined video data Vid_C2 and the second display device 374 shows both the first combined video data Vid_C1 and the second combined video data Vid_C2 by way of picture-in-picture frame. As shown in FIG. 11A, apart from the original frame content of FIG. 10A, the second display device 374 additionally shows a sub-frame whose content corresponds to the display frame Vid_C2' of the second combined video data Vid_C2 as shown in FIG. 10B.

Figure 11B:
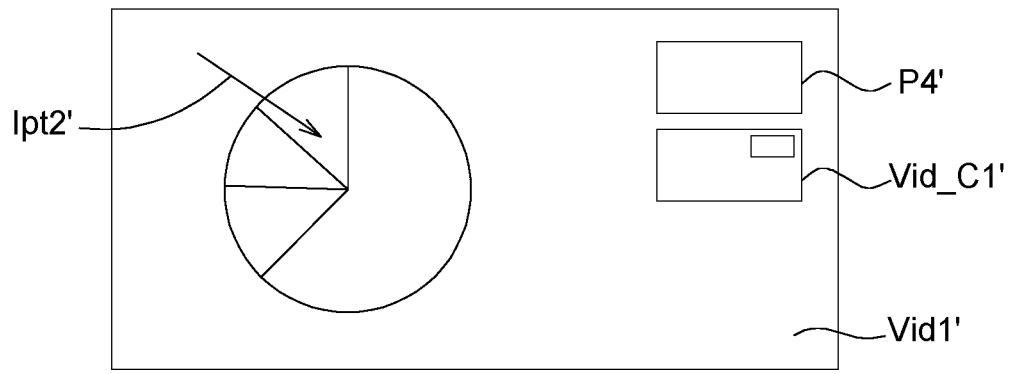
FIG. 11B is a schematic diagram of a picture-in-picture frame of a first display device corresponding to a first combined video data and a second combined video data according to the third embodiment of the present disclosure.

Refer to FIG. 11B, which shows a picture-in-picture frame of the first display device 372 when the first receiver device 340 optionally outputs both of the first combined video data Vid_C1 and the second combined video data Vid_C2 and the first display device 372 shows the first combined video data Vid_C1 and the second combined video data Vid_C2 by way of picture-in-picture frame. As shown in FIG. 11B, apart from the original frame content of FIG. 10B, the first display device 372 additionally shows a sub-frame whose content corresponds to the display frame Vid_C1' of the first combined video data Vid_C1 as shown in FIG. 10A.

As shown in FIG. 11A and FIG. 11B, through picture-in-picture frame, both the displayed frame of the first display device 372 at near end and the displayed frame of the second display device 374 at far end at least includes a first video data frame Vid1', a third user facial video frame P3', a first mouse curser trail Ipt1', a fourth user facial video frame P4', and a second mouse curser trail Ipt2'. Thus, all conference participants at the near end conference room and the far end conference room can real-timely understand that the third user P3 and the fourth user P4 are discussing the presentation data, and can see the mouse curser trail inputted by the third user P3 and the fourth user P4 respectively. In the future, those who view the recording of the video conference can also understand that the third user P3 and the fourth user P4 are discussing at that stage.

As disclosed in above embodiments, the video conference system for wireless presentation of the present disclosure combines the frame content of the presentation file and the video data of the presenter's face during the presentation process as a combined video data, and further outputs the combined video data to the receiver device at a far end conference room. The combined video data optionally includes the presenter-marked image of the frame content of the presentation file during the presentation process, such as the mouse curser trail inputted by the user. Thus, those who participate the video conference from a far end conference room through network can see the presenter's facial expression and have a higher sense of participation. Additionally, when the recording of the entire video conference is viewed in the future, the viewers can clearly understand which presenter or questioner is speaking at each stage, and the completeness of the conference record can be greatly increased.

While the invention has been described by way of example and in terms of the preferred embodiment (s), it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A video conference system, comprising:
    a transmitter device, comprising:
        a transmitter control unit, coupled to a video output port of an information system and configured to receive a first video data from the video output port;
        a transmitter input interface, coupled to a camera and configured to receive a second video data from the camera, wherein the second video data is a video data of a presenter's face captured by the camera;
        a transmitter video circuit, configured to combine the first video data and the second video data as a combined video data;
        a first wireless transmission module, configured to transmit the combined video data; and
        a first network interface; and
    a first receiver device, coupled to a display device, wherein the first receiver device comprises:
        a second wireless transmission module, configured to receive the combined video data and transmit the combined video data to the display device; and
    a second receiver device, comprising a second network interface;
    wherein through Internet, the first network interface transmits the combined video data to the second network interface of the second receiver device at far end;
    wherein the transmitter input interface is further coupled to a peripheral device and receive a user operation data from the peripheral device, and the transmitter video circuit combines the first video data, the second video data and the user operation data as the combined video data;
    wherein the transmitter device, the first receiver device, and the second receiver device are portable.

2. The video conference system according to claim 1, wherein the peripheral device is selected from a group consisting of a mouse, a touch pad and a handwriting pad, and the user operation data is a user marked presentation data.

3. The video conference system according to claim 1, wherein the transmitter video circuit comprises a scalar controller, the scalar controller comprises an image combining circuit, and the image combining circuit combines a video part of the first video data and a video part of the second video data as a video part of the combined video data.

4. The video conference system according to claim 1, wherein the transmitter video circuit comprises an audio processing circuit, the audio processing circuit combines an audio part of the first video data and an audio part of the second video data as an audio part of the combined video data.

5. The video conference system according to claim 1, wherein the transmitter input interface is a USB (Universal Serial Bus) interface port, and the camera transmits the second video data to the transmitter device video circuit through the USB interface port.

6. The video conference system according to claim 1, wherein the video output port of the information system is a high-definition multimedia interface (HDMI) video port, and the transmitter device further comprises an extended display identification data (EDID) code and provides the EDID code to the HDMI video port to perform reading; or
    the video output port of the information system is a Type-C USB connection port, and the transmitter device is coupled to the video output port of the information system through a connection line supporting a Type-C USB alternative mode.

7. A video conference system, comprising:
    a transmitter device, comprising:
        a transmitter control unit, coupled to a video output port of an information system and configured to receive a combined video data from the video output port, wherein the information system has an information system video circuit and obtains a first video data when processing an input file data;
        a transmitter input interface, coupled to the transmitter control unit and a peripheral device and configured to receive a user operation data from the peripheral device;
        a transmitter output interface, coupled to the information system and the transmitter control unit and configured to transmit the user operation data to the information system, wherein the information system video circuit combines the first video data and the user operation data as the combined video data;
        a first wireless transmission module, configured to transmit the combined video data; and
        a first network interface;
    a first receiver device, coupled to a display device, wherein the first receiver device comprises:
        a second wireless transmission module, configured to receive the combined video data from the first wireless transmission module and transmit the combined video data to the display device; and
    a second receiver device, comprising a second network interface;
    wherein through Internet, the first network interface transmits the combined video data to the second network interface of the second receiver device at far end;
    wherein the information system further comprises a system end input interface coupled to a camera and configured to receive a second video data from the camera, and the information system video circuit combines the first video data, the second video data and the user operation data as the combined video data;
    wherein the second video data is a video data of a presenter's face captured by the camera;
    wherein the transmitter device, the first receiver device, and the second receiver device are portable.

8. The video conference system according to claim 7, wherein the system end input interface is a USB interface port, the camera transmits the second video data to the information system video circuit through the USB interface port.

9. The video conference system according to claim 7, wherein the video output port of the information system is a high-definition multimedia interface (HDMI) video port, and the transmitter device further comprises an extended display identification data (EDID) code and provides the EDID code to the HDMI video port to perform reading; or
    the video output port of the information system is a Type-C USB connection port, and the transmitter device is coupled to the video output port of the information system through a connection line supporting a Type-C USB alternative mode.

10. The video conference system according to claim 7, wherein the peripheral device is selected from a group consisting of a mouse, a touch pad and a handwriting pad, and the user operation data is a user marked presentation data.

* * * * *